United States Patent
Kopelev

[15] 3,692,418
[45] Sept. 19, 1972

[54] PRECISION BORING MACHINE

[72] Inventor: Fridrikh Lvovich Kopelev, Komsomolskaya ulitsa, 43, kv. 5, Odessa, U.S.S.R.

[22] Filed: Aug. 28, 1970

[21] Appl. No.: 67,733

[52] U.S. Cl. ................... 408/8, 408/37, 408/234, 82/DIG. 1
[51] Int. Cl. ................... B23b 39/22, B23b 47/00
[58] Field of Search ............... 408/8, 37, 39, 56, 234; 82/900

[56] References Cited

UNITED STATES PATENTS 3,584,524  6/1971  Langenbach ............... 408/56

FOREIGN PATENTS OR APPLICATIONS 531,783  1/1941  Great Britain ............. 408/234

*Primary Examiner*—Francis S. Husar
*Attorney*—Holman & Stern

[57] ABSTRACT

A precision boring machine with compensated thermal deformation comprising a bed, one or two frames carrying, each, at least one spindle head and secured on the bed, and a work table for mounting the workpieces, said table sliding along the bed during boring operations, to compensate for the thermal deformations of the frame and spindle head and to improve the precision of machining, each spindle head is secured on the frame surface facing the work table so that it is located between the frame, and the work table.

11 Claims, 5 Drawing Figures

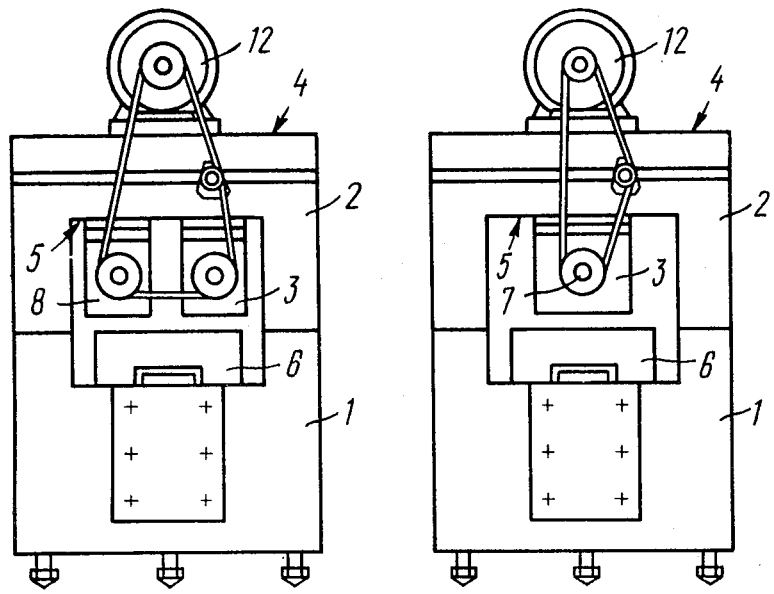
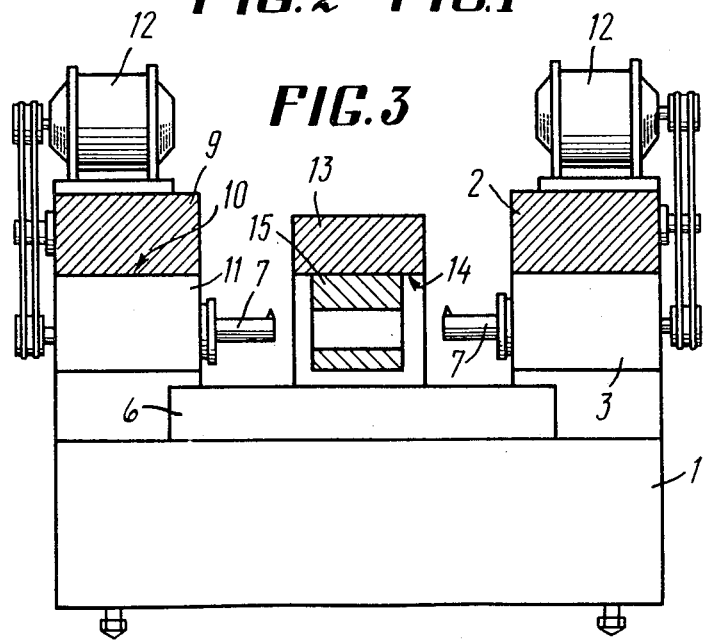

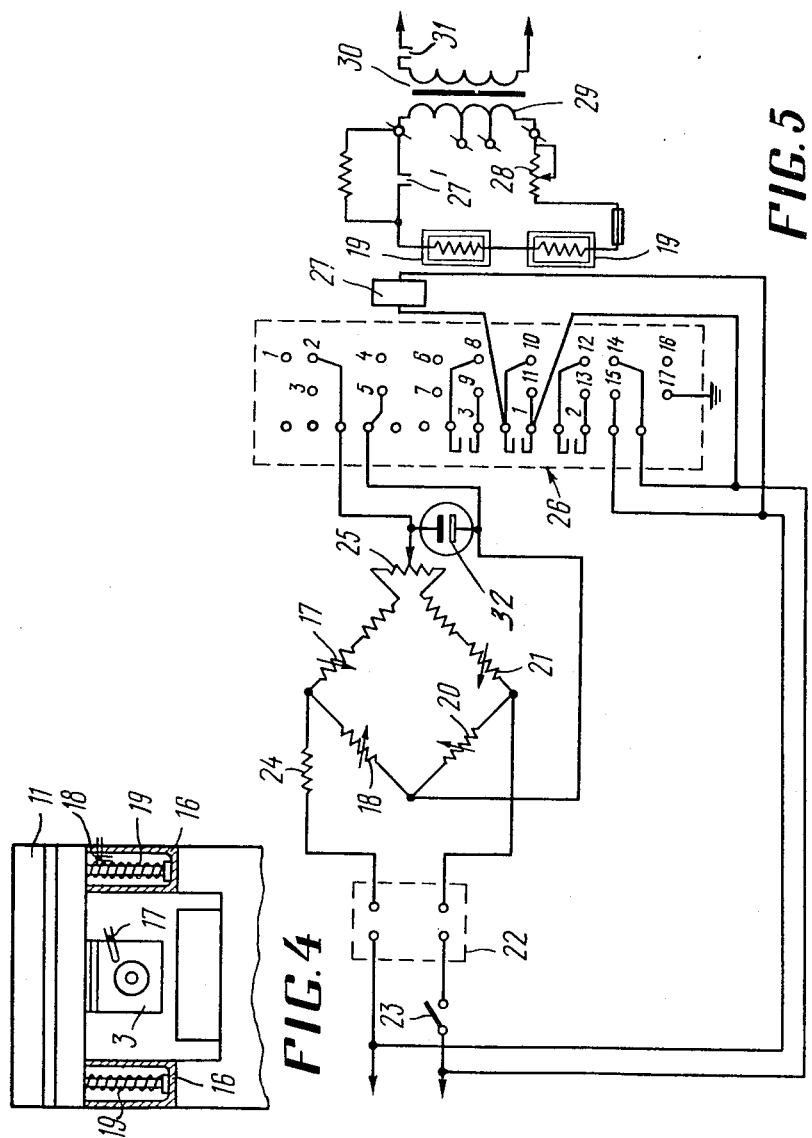

PRECISION BORING MACHINE

The present invention relates to precision boring machines and can be used, for example, in the machine utilizing diamond and carbide tools for the precision machining of articles. Known in the art are precision boring machines comprising a bed, one or two frames carrying one or more spindle heads with spindles. The frames are secured on the bed while the workpiece is set on the table which slides along the bed in the course of boring. The machines are equipped with special devices aimed to reduce and compensate for the thermal deformations, said devices being made in the form of cooling units.

The main disadvantage of the known machines lies in the complex design and installation of cooling units. Besides, in these machines the thermal deformations of the spindle shaft and of the frame carrying the spindle heads are directed towards one and the same side and are summed up, reducing the precision of boring.

An object of the invention is to alter the layout of the units of the precision boring machine.

This object is accomplished by providing a precision boring machine with compensated thermal deformations, said machine comprising a bed, one or two arched frames carrying, each, at least one spindle and mounted on the bed, and a work table for mounting the workpieces movable along the bed in the course of boring in which, according to the invention each spindle head is secured on the frame surface facing the work table so that said head is located between the frame and the work table.

A machine in which the frame pillars are hollow and pillars with a liquid may have transmitters registering the displacement of the spindle shaft and located, each, on the spindle head, and other transmitters registering the displacement of the frame caused by thermal deformations and located in the hollow frame pillars, these pillars also accommodating heater elements which are energized by the signals sent by said transmitters to compensate for the displacement of the spindle shaft in a required direction.

It is practicable that the function of transmitters registering the displacement of the spindle axis be performed by temperature transmitters.

Other objects and advantages of the present invention will be described hereinbelow by way of example with reference to the accompanying drawings, in which:

FIG. 1 is an end elevational view of the precision boring machine according to the invention, FIG. 2 shows an end elevational view of another embodiment of the precision boring machine incorporating two spindle heads according to the invention, FIG. 3 shows a side elevational view of the two-frame precision boring machine according to the invention, with portions in section, FIG. 4 shows a fragmentary section of FIG. 1 taken along the frame pillars, FIG. 5 is a diagram of a heater circuit connections according to the invention.

The precision boring machine comprises a bed 1 (FIG. 1), an arched frame 2 secured on the bed 1 and a spindle head 3, which is fastened not on the upper surface 4 of the frame as it is done in the known machines, but on its lower surface 5 facing the work table 6. Such a layout automatically compensates within certain limits for the thermal deformations of the machine, since the thermal expansions of the body of the spindle head 3 and of the pillars of the frame 2 cause differently-directed displacement of the shaft of the spindle 7, being subtracted from each other whereas in the ordinary layout these displacements are added, thereby impairing the precision of the machine.

FIG. 2 shows another embodiment of the machine comprising a second spindle head 8 located, like the spindle head 3, on the lower surface 5 of the frame 2.

FIG. 3 shows a two-frame machine which comprises a second frame 9 with a spindle head 11 secured on its lower surface 10.

Partial compensation of thermal deformation is achieved in equal degree in these embodiments of the claimed disclosed machines.

In all cases the upper surface 4 of the frame 2 is free for the installation of the drive motors 12 whose heating in operation has a positive function, causing additional thermal displacements.

In some cases the claimed layout offers additional advantages when, for example, the requirements of precision call for ensuring a minimum distance from the shaft of the spindle 7 to the guides of the table 6, also when installing widely-used attachments 13 with top-located set-up bases 14 for holding the workpiece 15 as shown in FIG. 3.

An advantage of these devices lies in reliable protection of the set-up bases 14 against the action of chips which becomes particularly important in automated loading.

It is preferable that the upper part of the frame be made separately from the pillars for facilitating machining and finishing the surface for mounting the spindle head. Depending on the adopted method for machining of the bed guides, the pillars may be either cast integral with the bed or be separate as shown in FIG. 4.

For additional precision, the degree of compensation for thermal deformation of the shaft of the spindle 7 is increased by the use of a device shown in FIG. 4. The pillars 16 of the frame 2 are made hollow and their spaces are filled with a liquid, e.g. a mineral oil. The body of the spindle head 3 accommodates a temperature transmitter 17, for example a resistance thermometer which can be substituted by any other pick-up responding to the displacement of the spindle shaft.

Located inside the pillars 16 of the frame 2 are the transmitters registering the displacement of the frame due to thermal deformation for example, temperature transmitters 18, and heater elements 19.

An elementary diagram of circuit connections of the transmitters 17 and 18 and heater elements 19 is shown in FIG. 5. The temperature transmitters 17 and 18 of the spindle head and frame are electrically connected with the temperature transmitters 20 and 21 of the ambient medium forming a bridge circuit which is connected to the mains through a converter 22 and a switch 23. The bridge circuit comprises adjusting resistors 24 and 25.

Cut into another diagonal of the bridge circuit is an adjusting potentiometer 26 with a relay 27 connected to its output.

The heater elements 19 are connected to a secondary winding 29 of the transformer 30 through contacts 27' of the relay 27 and an adjusting resistor 28.

Additional heating of the frame pillars is effected as follows.

The supply circuit of the heater elements is fed via the starter contacts 31 (starter not shown), the supply voltage being stepped down by the transformer 30.

The bridge circuit is supplied from the main through the converter 22.

While adjusting the machine, a required relation is set between the spindle temperature at 3 and that of the pillars 16 of the frame 2 to ensure the largest possible degree of compensation for thermal deformations. The temperature of the spindle head should be approximately three times higher than the temperature of the posts.

The required relation of temperatures is obtained with the aid of the adjusting resistors 24 and 25 cut into the circuit. A condenser 32 smoothes out the voltage pulsations.

The machine and ambient temperatures being equal, the bridge circuit is in balance. When the spindle head 3 gets heated in operation, and there appears an out-of-balance voltage in the diagonal of the bridge circuit; this voltage is fed to the input of the adjusting potentiometer 26 which switches on the heater elements 19 in the pillars 16 of the frame 2 through the contacts 27' of the relay 27. As a preset, temperature difference is attained, the out-of-balance voltage drops and the heater elements 19 cut off. The sensitivity of the circuit ensures the maintenance of the required relation between the temperatures of the head 3 and frame 2 within the entire period of warming and operation of the machine.

I claim:

1. A precision boring machine comprising a bed; a frame secured on said bed; a work table for fastening the workpieces sliding along said bed during boring operations; at least one spindle head with the spindle rigidly secured on the plane of said frame and facing said table so that said head, without moving relative to the machine's immovable parts is constantly arranged between said frame and the work table, said spindle head being fastened on the frame surface facing said work table so that said spindle head is located between said frame and work table; and means incorporated in said frame for compensating for the thermal deformations of said frame, due to operation of said spindle, and thermal deformations of said spindle head whereby the spindle is maintained substantially true to an adjusted position in spite of operational heat of the machine.

2. A precision boring machine comprising a bed; two frames secured on said bed; a work table for fastening the workpieces sliding along said frame during boring operations; two spindle heads with spindles rigidly secured on the plane of a corresponding frame, facing said work table so that both said spindle heads, without moving with regard to the machine's immovable parts, are constantly positioned between said frames and the work table, secured, each, on the surface of the corresponding frame, said surface facing the work table so that both spindle heads are located between said frame and work table; means compensating for the thermal deformations of the machine.

3. A precision boring machine comprising a bed; a frame secured on said bed; a work table for fastening the workpieces sliding along said bed during boring operations; at least one spindle head with the spindle, fastened on the frame surface facing said work table so that said spindle head is located between said frame and work table; means compensating for the thermal deformations of the machine, comprising hollow supporting pillars of said frame; liquid filling said frame pillars; transmitters registering the displacement of the shaft of said spindle of the spindle head and located on each of said spindle heads; transmitters registering the displacement of said frame due to thermal deformations and located in the spaces of said frame pillars; heating means located in said spaces of said frame pillars, connected with said transmitters registering the displacement of the spindle shaft and frame; said heating means are energized by the signals sent by said transmitters and, heating said liquid, create additional thermal deformations of the machine which compensate for the displacement of the shaft of said spindle in a required direction.

4. A precision boring machine comprising a bed; two frames secured on said bed; a work table for fastening the workpieces sliding along said frame during boring operations; two spindle heads with spindles, secured, each, on the surface of the corresponding frame, said surface facing the work table so that both spindle heads are located between said frame and work table; means compensating for the thermal deformations of the machine, comprising hollow pillars of said frames; liquid filling said pillars; transmitters registering the displacement of the shaft of said spindles of spindle heads and located on each of said spindle heads; transmitters registering the displacement of said frames due to thermal deformations and located in said spaces of hollow frame pillars; heating means located in said spaces of frame pillars and connected with said transmitters registering the displacement of the spindle shaft and frame; said heating devices are energized by the signals sent from said transmitters and, heating said liquid, create additional thermal deformations of the machine which compensate for the displacement of the shaft of said spindle.

5. A machine according to claim 3 wherein the function of the transmitters registering the displacement of the spindle shaft is performed by temperature transmitters.

6. A machine according to claim 4 wherein the function of the transmitters registering the displacement of the spindle shaft is performed by temperature transmitters.

7. A precision boring apparatus comprising:
    a bed;
    a frame projecting vertically above said bed;
    said bed including a work table thereon for mounting a work piece for movement toward and away from said frame in the plane of said bed during boring operations;
    a spindle head suspended from the under surface of said frame in spaced, overlying relation to said work table;
    said spindle head including a spindle projecting from said spindle head in parallel relation to the plane of said work table for engagement with the work piece;
    said frame comprising an arched member straddling and including pillars depending on each side and spaced from said spindle head whereby heat generated and transmitted from said spindle is not directly transmitted to said pillars, whereby thermal deformations are substantially eliminated at said spindle head, said frame and spindle substantially eliminating theremal deformation of said spindle relative to the work table.

8. The apparatus as claimed in claim 7 in which said pillars include means automatically sensing and compensating for thermal deformation of said spindle head and spindle relative to the work table.

9. The apparatus as claimed in claim 8 in which said means automatically compensating for thermal deformation comprises heat-transmitter means and heating means intimate with said pillars whereby deformation due to operational heat is substantially negated due to compensation by said means automatically sensing and compensating for thermal deformation.

10. The apparatus as set forth in claim 9 in which said pillars include a fluid therein and heat transmitters operatively connected to said spindle head and said pillars, said heating means being operatively connected to said fluid and a thermal compensating circuit whereby thermal deformations at the spindle are substantially negative when the apparatus is in operation.

11. The apparatus as claimed in claim 7 including power means mounted on the upper surface of said frame in opposition to said spindle head whereby thermal expansion caused by heat generated by operation of said spindle and said power means substantially cancel each other out.

* * * * *